(12) United States Patent
Lee (10) Patent No.: US 10,775,063 B2
(45) Date of Patent: Sep. 15, 2020

(54) POWER SUPPLY APPARATUS HAVING POWER SAVING FUNCTION AND AIR CONDITIONER INCLUDING THE SAME

(71) Applicant: LG ELECTRONICS INC., Seoul (KR)

(72) Inventor: Wonwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 15/854,192

(22) Filed: Dec. 26, 2017

(65) Prior Publication Data

US 2018/0283720 A1    Oct. 4, 2018

(30) Foreign Application Priority Data

Mar. 28, 2017    (KR) .......................... 10-2017-0039175

(51) Int. Cl.
*F24F 11/46* (2018.01)
*F24F 11/63* (2018.01)
(Continued)

(52) U.S. Cl.
CPC .............. *F24F 11/46* (2018.01); *F24F 11/63* (2018.01); *F24F 11/65* (2018.01); *F24F 11/70* (2018.01);
(Continued)

(58) Field of Classification Search
CPC .. F24F 11/46; F24F 11/88; F24F 11/30; F24F 11/63; F24F 11/66; H02M 3/33561; H02M 7/43
See application file for complete search history.

(56) References Cited

U.S. PATENT DOCUMENTS 5,824,990 A * 10/1998 Geissler ................... B23K 9/10
                                                219/130.21
5,883,484 A *  3/1999 Akao ................... B60L 15/025
                                                318/700
(Continued)

FOREIGN PATENT DOCUMENTS

EP    2 241 831    10/2010
EP    2 803 918    11/2014
(Continued)

OTHER PUBLICATIONS

European Search Report dated Jul. 30, 2018 issued in corresponding EP Application No. 18151765.7.

*Primary Examiner* — Nelson J Nieves
(74) *Attorney, Agent, or Firm* — Ked & Associates, LLP (57) ABSTRACT

A power supply apparatus having a power saving function and a related air conditioner are disclosed. The power supply apparatus includes a first communication unit, a first controller transmitting a control signal to the first communication unit, a main power supply including a switched-mode power supply (SMPS) connected to an AC power supply and supplying power and a standby power switch selectively switching power supplied to the SMPS, an auxiliary power supply connected to the AC power supply, a second communication unit connected to the first communication unit via a communication line and receiving power from the auxiliary power supply, a switching driver connected to the auxiliary power supply and the second communication unit and supplying driving power to the standby power switch according to the control signal, and a second controller receiving power from the SMPS and selectively supplying power to the switching driver.

11 Claims, 5 Drawing Sheets

(51) Int. Cl.
*F24F 11/65* (2018.01)
*H02M 7/48* (2007.01)
*H02M 3/335* (2006.01)
*F24F 11/70* (2018.01)
*F24F 140/60* (2018.01)
*H02M 1/00* (2006.01)

(52) U.S. Cl.
CPC ......... *H02M 3/33561* (2013.01); *H02M 7/48* (2013.01); *F24F 2140/60* (2018.01); *H02M 2001/009* (2013.01); *H02M 2001/0032* (2013.01); *Y02B 70/16* (2013.01)

(56) References Cited

U.S. PATENT DOCUMENTS

| | | | | |
|---|---|---|---|---|
| 6,049,185 | A * | 4/2000 | Ikeda | B60H 1/00392 318/442 |
| 9,979,328 | B1 * | 5/2018 | Chretien | H02P 1/426 |
| 2005/0254275 | A1 * | 11/2005 | Nojima | H02M 7/48 363/132 |
| 2007/0131784 | A1 * | 6/2007 | Garozzo | F24F 11/30 236/51 |
| 2008/0092570 | A1 * | 4/2008 | Choi | F24F 11/30 62/157 |
| 2012/0161514 | A1 * | 6/2012 | Choi | H02M 3/33561 307/17 |
| 2013/0067941 | A1 * | 3/2013 | Lee | F24F 11/30 62/126 |
| 2015/0001962 | A1 * | 1/2015 | Higashiyama | F24F 11/89 307/113 |
| 2015/0008762 | A1 * | 1/2015 | Higashiyama | F24F 1/20 307/113 |
| 2015/0013362 | A1 * | 1/2015 | Yumoto | F24F 11/30 165/237 |
| 2015/0198349 | A1 * | 7/2015 | Numazaki | F24F 3/00 165/212 |
| 2016/0131387 | A1 * | 5/2016 | Sawada | H02H 3/253 62/158 |
| 2016/0265801 | A1 * | 9/2016 | Iijima | G05B 15/02 |
| 2016/0363338 | A1 * | 12/2016 | Yamane | F24F 11/30 |
| 2018/0017280 | A1 * | 1/2018 | Tanabe | F24F 11/30 |
| 2018/0080671 | A1 * | 3/2018 | Makino | F24F 11/30 |
| 2018/0198390 | A1 * | 7/2018 | Oya | H02P 6/153 |
| 2018/0278049 | A1 * | 9/2018 | Sakurai | F24F 11/88 |
| 2018/0367024 | A1 * | 12/2018 | Kim | H02M 1/12 |

FOREIGN PATENT DOCUMENTS

| | | |
|---|---|---|
| JP | 2000-346425 | 12/2000 |
| KR | 10-2007-0059273 | 6/2007 |
| KR | 10-2008-0035173 | 4/2008 |
| WO | WO 2017/148390 | 9/2017 |

* cited by examiner

FIG. 6

POWER SUPPLY APPARATUS HAVING POWER SAVING FUNCTION AND AIR CONDITIONER INCLUDING THE SAME

CROSS-REFERENCE TO RELATED APPLICATION

This application claims priority under 35 U.S.C. § 119 to Korean Application No. 10-2017-0039175, filed on Mar. 28, 2017, whose entire disclosure is hereby incorporated by reference.

BACKGROUND

1. Field

The present disclosure relates to a power supply apparatus and, more particularly, to a power supply apparatus having a power saving function and an air conditioner including the same.

2. Background

A compressor installed at an outdoor unit of an air conditioner may be driven by a motor. Alternating current (AC) power may be supplied to the motor from a power conversion device. The power conversion device may include a rectifier, a power factor controller, and an inverter.

A commercial AC voltage output from a commercial power source may be rectified or otherwise processed by the rectifier. The voltage rectified by the rectifier may be supplied to the inverter. The inverter may generate AC power to drive the motor using the rectified voltage received from the rectifier. An air conditioner may further include a switched-mode power supply (SMPS) for supplying power to a controller (or a microcontroller) and other parts of the air conditioner.

In addition, the air conditioner may include one or more communication units (or communication interfaces) to communicate between an indoor unit (sometimes referred to as an air handler) and the outdoor unit where the compressor is located. The outdoor unit may be controlled according to operational control of the air conditioner performed mainly by the indoor unit.

If a user provides an input to the indoor unit to stop operation the air conditioner or a predetermined time elapses after the user last operates the air conditioner using a remote controller or other input device, the outdoor unit of the air conditioner may enter a standby power state, which may also be referred to as a power saving mode. In the power saving mode, a power consumption by the air conditioner may be reduced by cutting off a portion of power supplied to the outdoor unit to prevent operation of the compressor However, even in this power saving mode, the SMPS may still operate and consume power, such that the air conditioner has an undesirably low energy efficiency.

BRIEF DESCRIPTION OF THE DRAWINGS

The embodiments will be described in detail with reference to the following drawings in which like reference numerals refer to like elements, and wherein.

DETAILED DESCRIPTION

Figure 1:
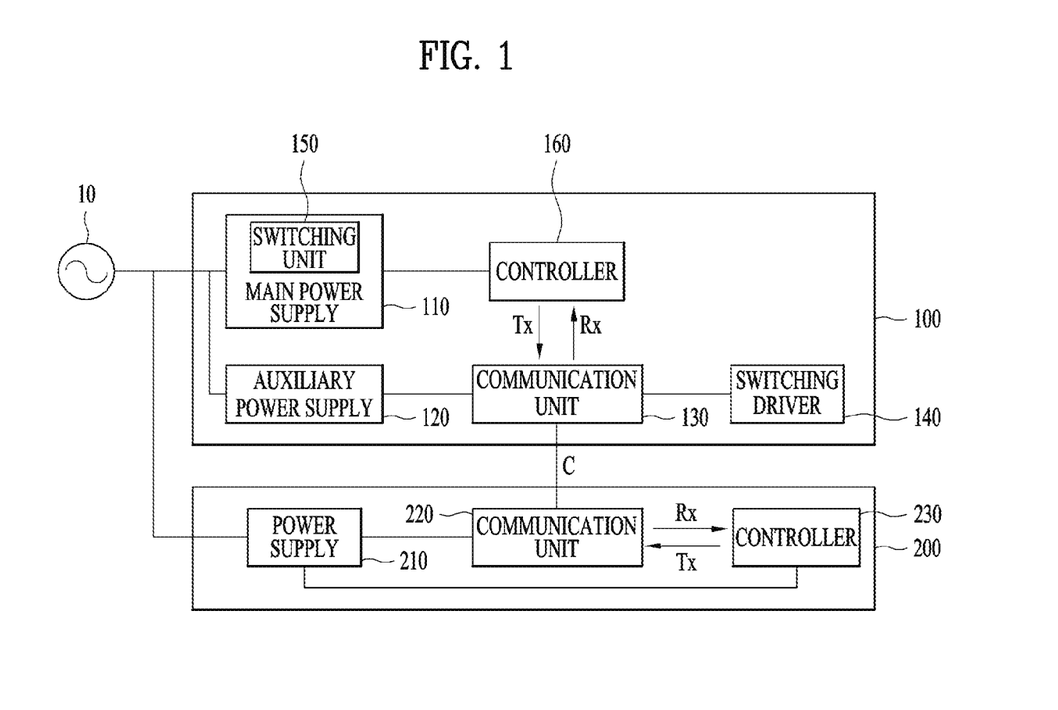
FIG. 1 is a block diagram of a power supply apparatus according to an embodiment of the present disclosure.

FIG. 1 is a block diagram of a power supply apparatus (also referred to as a power supply or a power supply circuit) according to an embodiment of the present disclosure. The power supply apparatus of the present disclosure may include a first device 100 and a second device 200. The first device 100 and the second device 200 may be connected to or may otherwise communicate with each other by a communication line C.

The first device 100 and the second device 200 may include a first communication unit (or first communication interface) 130 and a second communication unit (or second communication interface) 220, respectively. The first device 100 and the second device 200 may communicate with each other by the first communication unit 130 and the second communication unit 220. This communication process may be performed under control of the first controller 160 and the second controller 230. Through the communication process, the first device 100 may enter a power saving mode, thereby reducing power consumption of the power supply apparatus.

Hereinafter, the first device 100 and the second device 200 will be described as devices constituting an air conditioner. That is, the first device 100 and the second device 200 may correspond to an outdoor unit (e.g., a compressor) and an indoor unit of the air conditioner, respectively. Referring to FIG. 1, the air conditioner may normally include the indoor unit 100 installed at an outdoor area and the indoor unit 200 installed at an indoor area. In this case, the outdoor unit 100 and the indoor unit 200 may be connected to each other by the communication line C.

The outdoor unit 100 may include a main power supply 110 connected to an external AC power supply 10 to supply power to components of the outdoor unit 100, an auxiliary power supply 120 separately connected to the external AC power supply 10, an outdoor communication unit (or outdoor communication interface) 130 to communicate with the indoor unit 200, a switching driver 140 that selectively turns off the main power supply 110 when, for example, a power saving function is implemented, and an outdoor unit controller (or outdoor controller) 160 that controls operation of the outdoor unit 100.

The main power supply 110 may include a standby power switching unit (or standby power switch) 150 to selectively switch on/off power supplied to the various components of the outdoor unit 100. The standby power switching unit 150 may be driven by the switching driver 140 based on, for example, whether the first device 100 has entered a power saving mode. The switching driver 140 may selectively drive the standby power switching unit 150 based on receiving a signal transmitted by the outdoor communication unit 130, such as receiving a signal to enter the power saving mode.

In the example shown in FIG. 1, the outdoor communication unit 130 may be supplied with power by the auxiliary power supply 120. The outdoor communication unit 130 may transmit and receive a control signal to and from the outdoor unit controller 160. In this case, a signal transmitted to the outdoor communication unit 130 by the outdoor unit controller 160 may be referred to as a transmission signal Tx, and a signal received from the outdoor communication unit 130 by the outdoor unit controller 160 may be referred to as a reception signal Rx.

Meanwhile, the indoor unit 200 may include an indoor communication unit (or indoor communication interface) 220, and an indoor unit controller (or indoor controller) 230 that may transmit a control signal (e.g., signal Tx) to the indoor communication unit 220. As in the outdoor unit 100, a signal transmitted to the indoor communication unit 220 by the indoor unit controller 230 may be referred to as a transmission signal Tx, and a signal received from the indoor communication unit 220 by the indoor unit controller 230 may be referred to as a reception signal Rx.

In the example shown in FIG. 1, the indoor unit controller 230 may receive power from the indoor unit power supply 210 connected to the external AC power supply 10. Thus, both the outdoor unit 100 and the indoor unit 200 may be connected to the AC power supply 10 and may be independently supplied with power by the AC power supply 10.

The switching driver 140 of the outdoor unit 100 may be connected to the auxiliary power supply 120 and the outdoor communication unit 130 to supply driving power to the standby power switching unit 150 according to the control signal Tx transmitted from the indoor unit controller 230 through the indoor communication unit 220.

Figure 2:
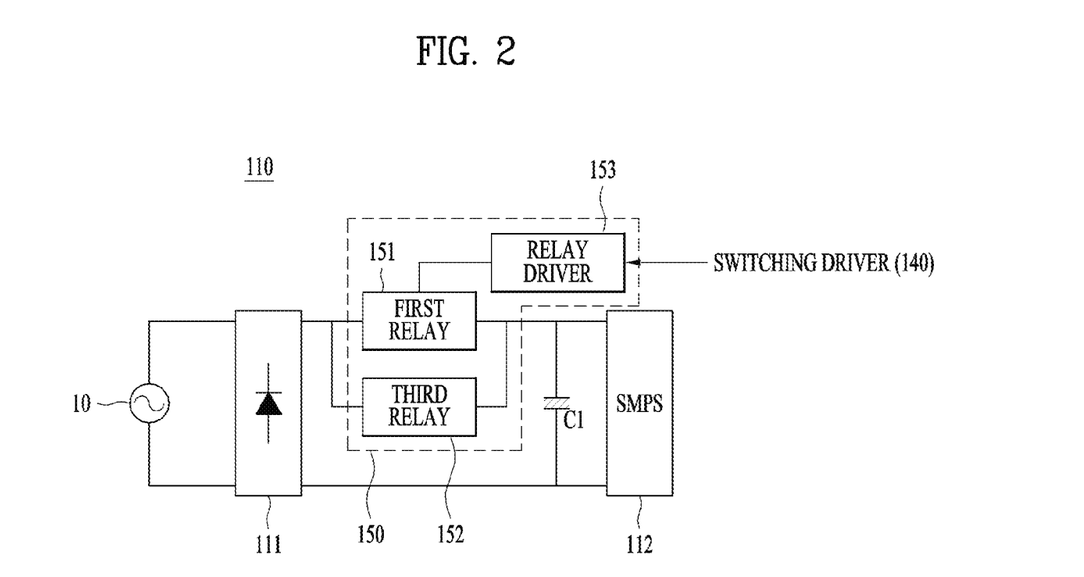
FIG. 2 is a detailed block diagram of a main power supply of an outdoor unit of an air conditioner according to an embodiment of the present disclosure.

FIG. 2 shows a main power supply 110 of an outdoor unit 100 of an air conditioner according to one embodiment. Referring to FIG. 2, the main power supply 110 of the outdoor unit 100 may include a rectifier 111 connected to the AC power supply 10, a first capacitor C1 which may store a charge outputted by the rectifier 111, and an SMPS 112 that may supply power to the outdoor unit controller 160 or other components of the outdoor unit 100 using that charge stored in the first capacitor C1.

The rectifier 111 may rectify a power input received from the AC power supply 10 and may output the rectified power to the SMPS 112. To rectify the power input received from the AC power supply 10, the rectifier 111 may include a full-wave rectification circuit using bridge diodes.

The above-described standby power switching unit 150 may be connected between the AC power supply 10 and the SMPS 112. More specifically, the standby power switching unit 150 may be connected between the rectifier 111 and the first capacitor C1.

The standby power switching unit 150 may include a first relay 151 and a third relay 152. The standby power switching unit 150 may further include a relay driver 153 that drives (or activates) the first relay 151. Herein, the first relay 151 and the third relay 152 may be connected in parallel to be selectively connected between the AC power supply 10 and the SMPS 112.

The first relay 151 may be operated by a driving signal transmitted from the switching driver 140. That is, the first relay 151 may be switched on/off by the driving signal transmitted from the switching driver 140 For example, the driving signal transmitted by the switching driver 140 may drive the relay driver 153. Upon receiving the driving signal transmitted by the switching driver 140, the relay driver 153 may drive the first relay 151, using power received from the auxiliary power supply 120.

When the air conditioner enters a power saving mode, both the first relay 151 and the third relay 152 may be switched off such that no power is transmitted to the SMPS 112 and operation of the SMPS 112 may be stopped. Meanwhile, when the air conditioner is normally operated (e.g., not in the power saving mode), at least one of the first relay 151 and the third relay 152 may be connected (i.e., switched on) so that the SMPS 112 may receive power and be smoothly operated.

Figure 3:
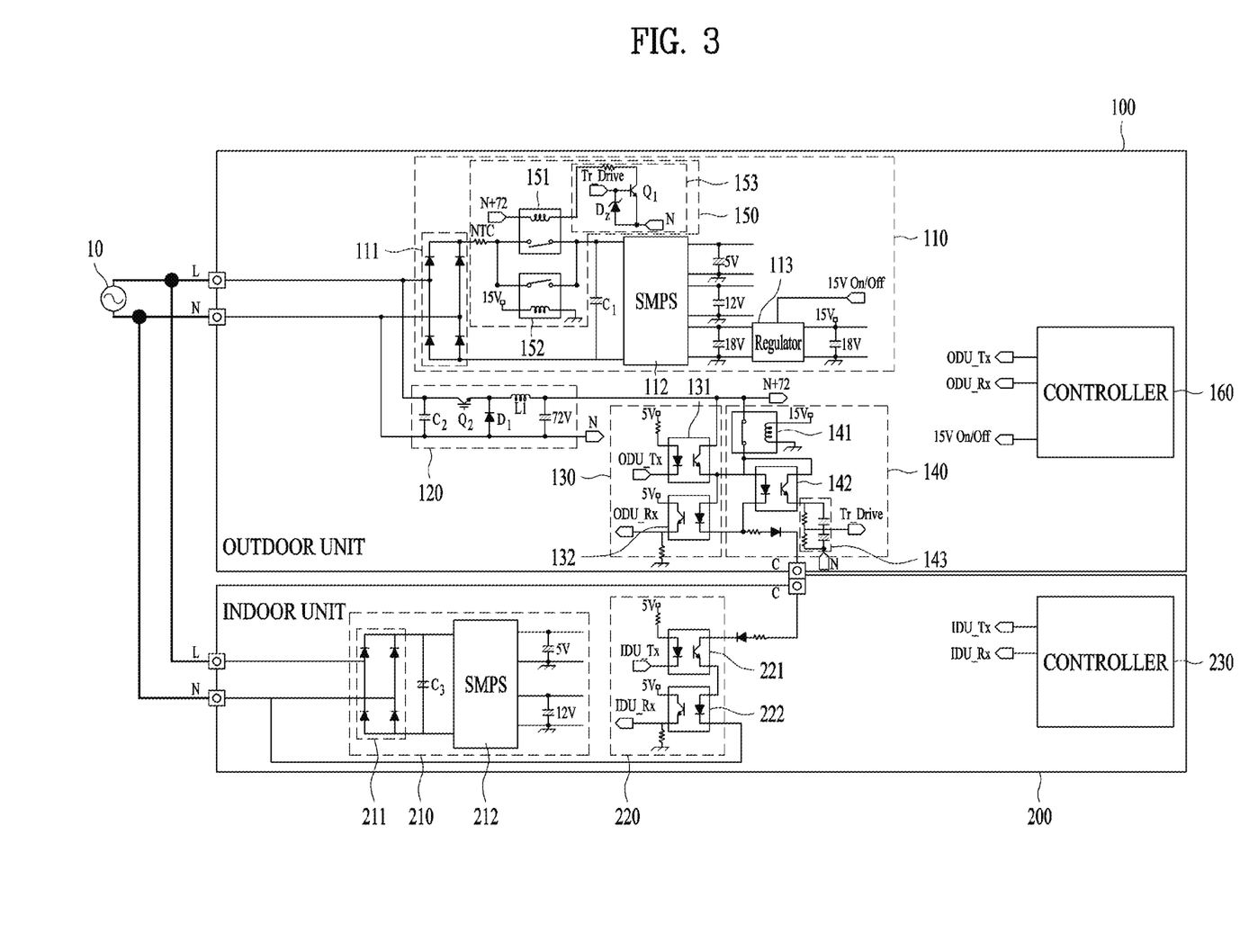
FIG. 3 is a circuit diagram of an air conditioner according to an embodiment of the present disclosure.

FIG. 3 is a circuit diagram of a representative air conditioner according to an embodiment of the present disclosure. Hereinafter, a circuit configuration of the air conditioner according to this embodiment will be described in detail with reference to FIG. 3.

First, the first relay 151 and the third relay 152 of the standby power switching unit 150 may be active high relays in which switches are turned on when power is supplied to inductors thereof. The first relay 151 may be driven by the auxiliary power supply 120. The auxiliary power supply 120 may supply a voltage of 72V (or other voltage). That is, one terminal N of the auxiliary power supply 120 may be connected to a ground and the other terminal N+72 of the auxiliary power supply 120 may output a signal of a voltage difference higher by 72V than a voltage of the one terminal N.

The one end N and the other end N+72 of the auxiliary power supply 120 may be connected to terminals of an inductor of the first relay 151. A transistor Q1 to perform a switching operation by the driving signal transmitted by the switching driver 140 may be connected between the one end N and the other end N+72 of the auxiliary power supply 120 connected to the first relay 151. That is, the relay driver 153 may include the transistor Q1 for driving the first relay 151.

A base of the transistor Q1 may be connected to a driving signal input terminal Tr_Drive, which is connected to the switching driver 140. Specifically, the driving signal input terminal Tr_Drive may be connected to an output terminal Tr_Drive of a driving signal generator 143 of the switching driver 140. Accordingly, when the driving signal is transmitted to the relay driver 153 by the switching driver 140 under a specific condition such as switching to a power saving mode, this transistor Q1 may be driven and the first relay 151 may enter an ON state.

The auxiliary power supply 120 of the outdoor unit 100 may include a buck converter. That is, the auxiliary power supply 120 may include a second capacitor C2 located at the foremost stage, a first diode D1, an inductor L1 connected to the first diode D1, a 72V capacitor connected to the first diode D1 in parallel, and a switching element Q2 connected between the second capacitor C2 and the first diode D1.

The buck converter may be capable of obtaining an output voltage that is lower than an input voltage. For example, when the switching element Q2 is turned on, current may flow through an inductor-capacitor filter including the inductor L1 and the 72V capacitor, and an output voltage may be generated at an output terminal. For example, when the switching element Q2 is turned off, energy which has been stored in the inductor L1 may be discharged through the first diode D1 to generate current. Then, a voltage across both terminals of the inductor L1 may be transmitted to the output terminal.

Meanwhile, the SMPS 112 may output direct current (DC) voltages of 5V, 12V, and 18V (or other voltages). The outdoor unit controller 160 may be operated by the voltage of 5V output from the SMPS 112. A regulator 113 may be connected to an output terminal of 18V of the SMPS 112. The regulator 113 may be supplied with an operating signal 15V On/Off (e.g., a signal of 5V) by the outdoor unit controller 160. In this way, upon receiving the operating signal 15V On/Off from the outdoor unit controller 160, the regulator 113 may output a voltage of 15V. When the outdoor unit controller 160 outputs a low signal or the outdoor unit controller 160 is turned off (even in this case, a low signal is output), the regulator 113 may not operate and may not output a voltage of 15V.

Meanwhile, an inductor of the third relay 152 may be connected to the regulator 113. That is, the third relay 152 may be operated by a driving signal of the regulator 113.

The switching driver 140 may include a second relay 141 connected to the other terminal N+72 of the auxiliary power supply 120, a first photocoupler 142 connected to the second relay 141, and a driving signal generator 143 for transmitting a driving signal to the relay driver 153. In the example shown in FIG. 3, the second relay 141 may be an active low relay in which a switch is turned off when a power source is supplied to an inductor thereof. The inductor of the second relay 141 may be connected to an output terminal of the regulator 113.

Accordingly, when the regulator 113 outputs the driving signal of 15V, the second relay 141 may be turned off. In this case, since the regulator 113 operates according to a signal of the outdoor unit controller 160, the regulator 113 may transmit the driving signal to the second relay 141 and the third relay 142 according to the signal of the outdoor unit controller 160.

When the second relay 141 enters an ON state and current flows through the first photocoupler 142, the driving signal of the driving signal generator 143 may be transmitted through an output terminal Tr_Drive to an input terminal Tr_Drive of the relay driver 153 so that the transistor Q1 may be driven.

The outdoor communication unit 130 may be connected to the other terminal N+72 of the auxiliary power supply 120. The outdoor communication unit 130 may include a second photocoupler 131 and a third photocoupler 132, which may be connected in opposite directions.

Each of the photocouplers 131, 132, and 142 may include a diode and a transistor which may be provided to face each other. Each photocoupler may be designed such that, when a current flows into the diode, current also flows into the transistor and, when the current does not flow into the diode, current also does not flow into the transistor. In the example shown in FIG. 3, the diode and transistor of the second photocoupler 131 may be connected in opposite directions in comparison to the diode and transistor of the third photocoupler 132. For example, as illustrated in FIG. 3, the transistor of the second photocoupler 131 may be connected to the other terminal N+72 of the auxiliary power supply 120, and the transistor of the second photocoupler 131 may be connected to the diode of the third photocoupler 132. The diode of the third photocoupler 132 may be connected to the indoor communication unit 220 through a communication line C.

The transistor of the second photocoupler 131 and the second relay 141 may be connected to a diode of the first photocoupler 142. The diode of the second photocoupler 131 may receive a transmission signal ODU_Tx from the outdoor unit controller 160, and the outdoor unit controller 160 may receive a reception signal ODU_Rx through the transistor of the third photocoupler 132. In this configuration, the diode of the second photocoupler 131, which receives the transmission signal ODU_Tx through one terminal thereof from the outdoor unit controller 160, may receive a voltage of 5V through the other terminal thereof. Moreover, the transistor of the third photocoupler 132, which transmits the reception signal ODU_Rx through one terminal thereof, may receive the voltage of 5V through another terminal thereof.

Similar to the outdoor communication unit 130, the indoor communication unit 220 may include a fourth photocoupler 221 and a fifth photocoupler 222 that are connected in relative opposite directions. For example, a diode of the fourth photocoupler 221 may be connected to the diode of the third photocoupler 132 through the communication line C and may also be connected to a transistor of the fifth photocoupler 222.

The diode of the fourth photocoupler 221 may receive a transmission signal IDU_Tx from the indoor unit controller 230 and the indoor unit controller 230 may receive a reception signal IDU_Rx from the transistor of the fifth photocoupler 222. In the configuration shown in FIG. 3, the diode of the fourth photocoupler 221 that receives the transmission signal IDU_Tx from the indoor unit controller 230 through one terminal thereof may also receive a voltage of 5V through the other terminal thereof. Similarly, the transistor of the fifth photocoupler 222 that transmits the reception signal IDU_Rx through one terminal thereof may also receive the voltage of 5V through another terminal thereof.

The indoor power supply 210 may include a rectifier 211, a third capacitor C3, and an SMPS 212. The SMPS 212 may output voltages of 5V and 12V. The indoor unit controller 230 may be operated by the voltage of 5V output from the SMPS 212. The operation and function of the indoor power supply 210 may be similar to the operation and function of the outdoor main power supply 110, and the previous description of the operation and function of the outdoor main power supply 110 may be generally applicable to the indoor power supply 210.

Figure 4:
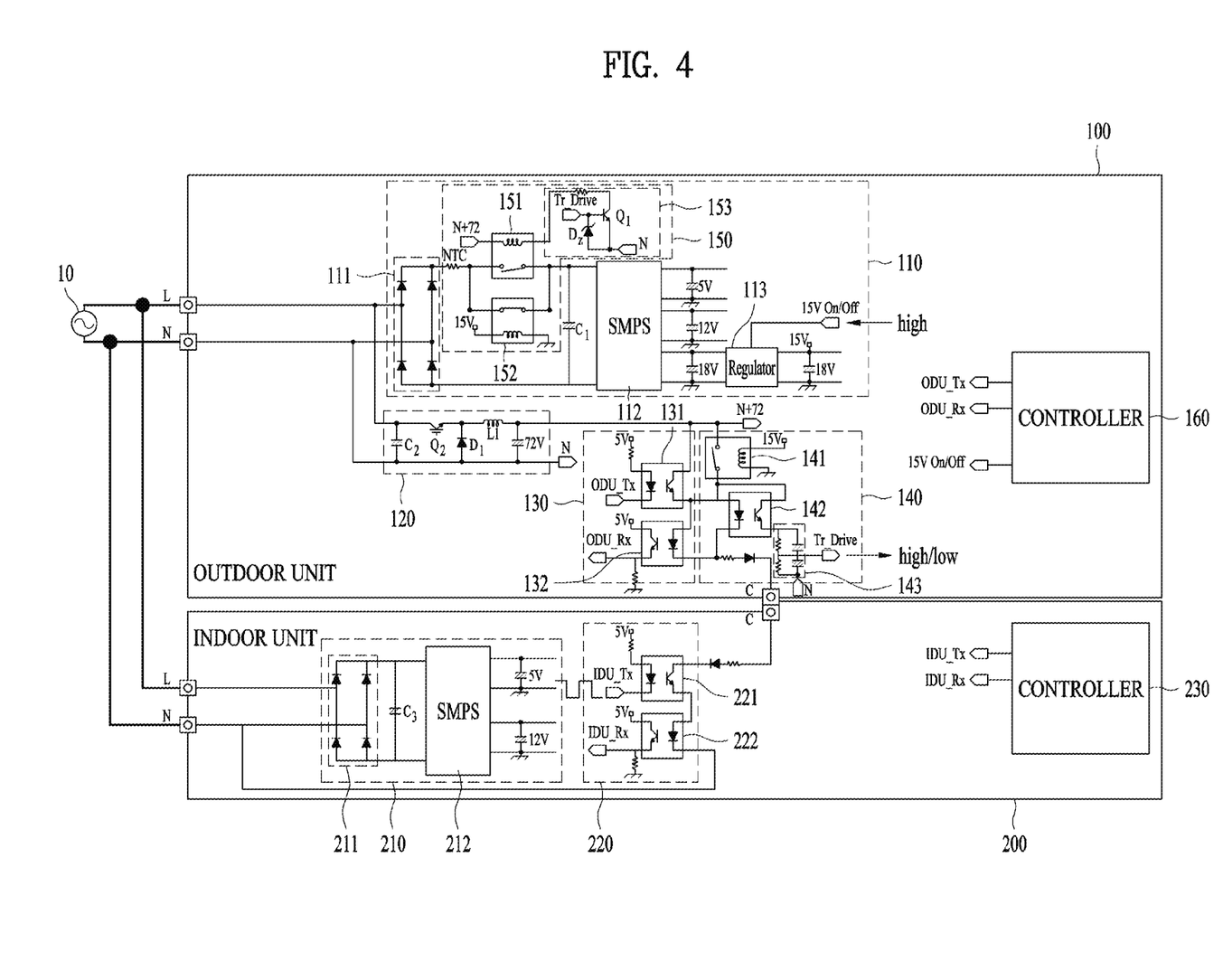
FIG. 4 is a circuit diagram illustrating an operation of an air conditioner in a normal operation state according to an embodiment of the present disclosure.
Figure 5:
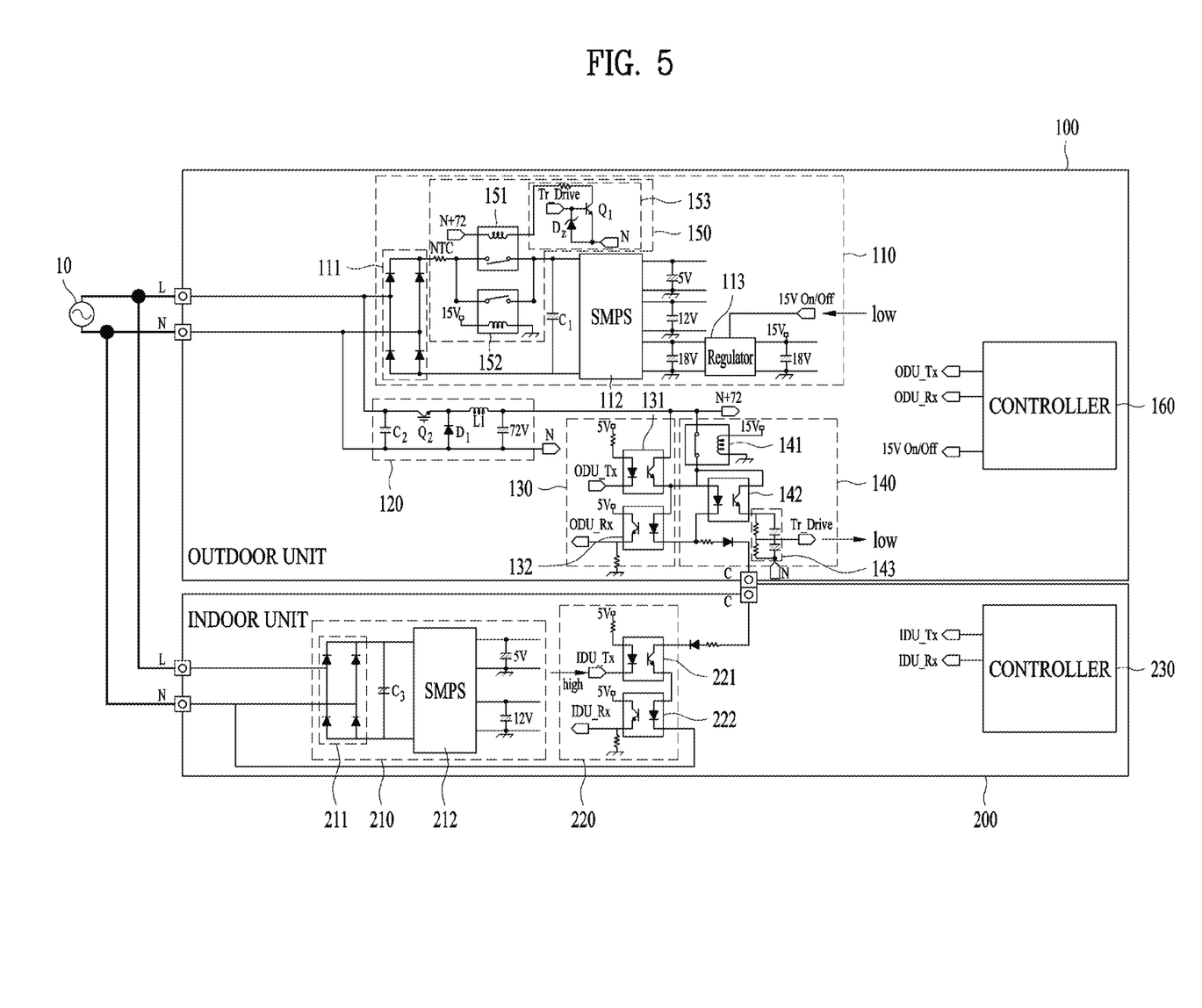
FIG. 5 is a circuit diagram illustrating an operation of an air conditioner during switching to a power saving mode state according to an embodiment of the present disclosure.
Figure 6:
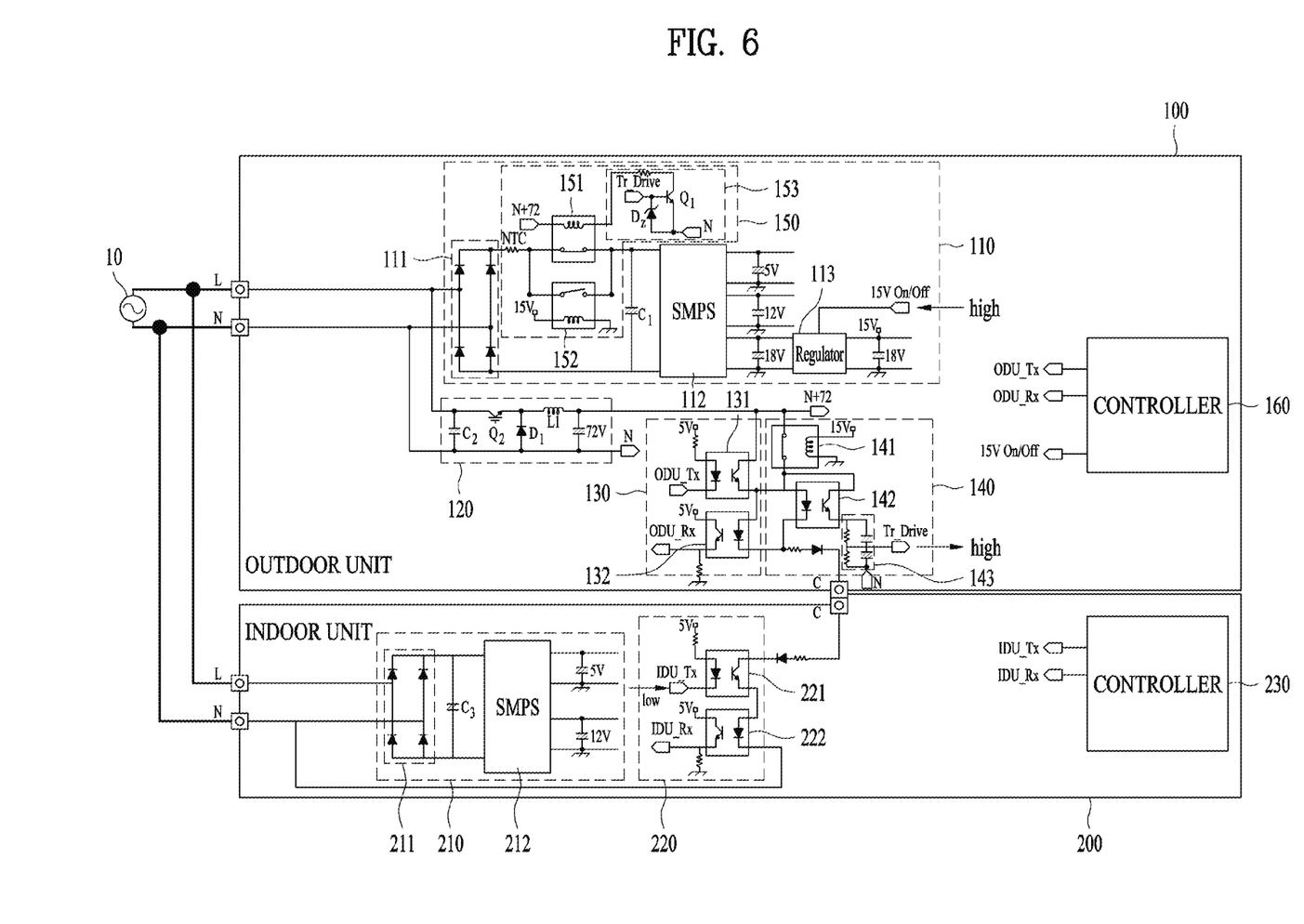
FIG. 6 is a circuit diagram illustrating an operation of an air conditioner during switching to a normal operation state from a power saving mode according to an embodiment of the present disclosure.

FIGS. 4 to 6 are circuit diagrams illustrating operations of an air conditioner, such as the air conditioner depicted in FIG. 3, according to embodiments of the present disclosure. Specifically, FIG. 4 illustrates an operation of an air conditioner in a normal operation state; FIG. 5 illustrates an operation of an air conditioner during switching to a power saving mode; and FIG. 6 illustrates an operation of an air conditioner during switching to a normal operation state from a power saving mode according to an embodiment of the present disclosure. Hereinafter, an operation of the air conditioner according to an embodiment of the present disclosure will be described in detail with reference to FIGS. 4 to 6.

First, the operation of the air conditioner in a normal operation state will now be described with reference to FIG. 4. Referring to FIG. 4, the first relay 151 of the standby power switching unit 150 is in an off state, and the third relay 152 of the standby power switching unit 150 is in an on state. Accordingly, the SMPS 112 may receive power through the third relay 152 such that the SMPS 112 may operate normally.

The outdoor unit controller 160 may operate by receiving power from the SMPS 112 and may transmit a 15V On/Off operation signal to the regulator 113, so that the regulator 113 may output a voltage of 15V. The second relay 141 of the switching driver 140 may enter an off state because the regulator 113 outputs the voltage of 15V.

The indoor unit controller 230 may repeatedly transmit the On/Off signal (in a square wave form) to the fourth relay 221 of the indoor communication unit 220 so that communication is performed between the outdoor unit 100 and the indoor unit 200. Herein, if the indoor unit controller 230 transmits a signal through the indoor communication unit 220, this signal may be transmitted to the outdoor communication unit 130 through the communication line C and may then be forwarded to the outdoor unit controller 160. In addition, if the outdoor unit controller 160 transmits a signal through the outdoor communication unit 130, this signal may be transmitted to the indoor communication unit 220 through the communication line C and then maybe transmitted or forwarded to the indoor unit controller 230.

Through the above scheme, the outdoor unit 100 and the indoor unit 200 may exchange signals. In this process, the switching driver 140 may repeatedly output a High/Low signal, and then, the first relay 151 may repeat an On/Off operation. However, the SMPS 112 may continue to stably receive power through the third relay 152.

Next, the operation of the air conditioner when switching to a power saving mode from a normal operation state will be described with reference to FIG. 5. Referring to FIG. 5, a user may stop operating the air conditioner through the indoor unit 200, and the air conditioner may enter a power saving mode. For example, when the user stops operating the air conditioner through the indoor unit 200 by use of a remote controller or when a predetermined time elapses after the user stops operating the air conditioner by use of the remote controller, the air conditioner may switch to a power saving mode.

In these or other situations triggering a switch to the power saving mode, the indoor unit controller 230 may transmit a power saving signal to the indoor communication unit 220. Specifically, the indoor unit controller 230 may transmit a High signal to the fourth photocoupler 221 of the indoor communication unit 220.

Accordingly, both ends of the fourth photocoupler 221 may have an equal voltage difference or a decreased voltage difference and no current flows through the fourth photocoupler 221. In this state, since no current flows through the switching driver 140, the switching driver 140 may output a Low signal. Accordingly, the transistor Q1 in the relay driver 153 may be turned off due to the low signal outputted by the switching driver 140.

When the outdoor unit controller 160 transmits a low signal to the regulator 113 (e.g., when the outdoor unit controller 160 outputs a low signal or in the case that power is not supplied to the outdoor unit controller so that the outdoor unit 160 is turned off), the regulator 113 does not output a voltage of 15V (or other value). Then, the third relay 152 may be turned off, and the second relay 141 way be turned on.

Thus, since both the first relay 151 and the third relay 152 are turned off, power may not be supplied to the SMPS 112, and consequently, an operation of the SMPS 112 may be stopped. That is, when the air conditioner switches to a power saving mode, a power source supplied to the SMPS 112 and the main power supply 110 is cut off, thereby reducing power consumption. While the main power supply including the SMPS 112 may typically consumes power of about 1 W or so, and overall power consumed in the air conditioner may be lower than 1 W in a power saving mode. According to the above-described configuration shown in FIG. 5, the main power source 110 of the outdoor unit 100 may be cut off regardless of an indoor inlet type or an outdoor inlet type of a power source, thereby reducing power consumption in a power saving mode.

Next, an operation of the air conditioner during switching back to a normal operation state and from a power saving mode according to an embodiment of the present disclosure will now be described with reference to FIG. 6. As described above, the indoor unit controller 230 in a power saving mode may continue to transmit a High signal to the fourth photocoupler 221 of the indoor communication unit 220. A Low signal may then be transmitted to the regulator 113 so that the regulator 113 does not output a voltage of 15V. In addition, the first relay 151 and the third relay 152 may be turned off, and the second relay 141 may be turned on. Accordingly, a power source supplied to the SMPS 112 and the main power supply 110 may be cut off in this state The air conditioner may change from this power-saving mode to operate normally, for example, when a signal to activate the air conditioner is received (e.g., when a user uses a remote controller to request normal operation of the air conditioner), the air conditioner switches from a power saving mode to a normal operation made. This process will now be described.

First, the indoor unit controller 230 may transmit a signal for switching to an operation state from a power saving mode to the indoor communication unit 220. Specifically, the indoor unit controller 230 may output a low signal to the fourth photocoupler 221 of the indoor communication unit 220. Accordingly, current may flow through the fourth photocoupler 221 with a voltage of 5V (or other voltage) supplied by the indoor unit power supply 210. In this state, current flows through the switching driver 140, and the switching driver 140 outputs a High signal, so that the transistor Q1 in the relay driver 153 is turned on.

Then, the first relay 151 may receive power from the auxiliary power supply 120 and may be switched on. Thereby, the SMPS 112 may enter an On state, and the SMPS 112 may supply power to components of the outdoor unit 100. As such, the outdoor unit controller 160 may also operate and transmit a high signal to the regulator 113 so that the regulator 113 may outputs a voltage of 15V (or other similar value). Then, the third relay 152 may also be switched on, and power can be stably supplied to the SMPS 112. As a result, the air conditioner including the outdoor unit 100 may switch from the power saving mode to normally operate.

The above-described power supply apparatus having a power saving function has been described by way of an example applied to an air conditioner. However, as described above, the present disclosure is also applicable to a power supply apparatus and an apparatus including the power supply apparatus, in which the first device 100 and the second device 200, which are physically divided, operate as one device or the first device 100 and the second apparatus 200 communicate with each other by implementing the first communication unit 130, the second communication unit 220, and an associated configuration. Accordingly, the present disclosure may be directed to a power supply apparatus having a power saving function and an air conditioner including the same, which substantially obviate one or more problems due to limitations and disadvantages of the related art.

An aspect of the present disclosure provides a power supply apparatus having a power saving function capable of reducing power consumption in a standby power state and an air conditioner including the same. Another aspect of the present disclosure provides a power supply apparatus having a power saving function capable of reducing power consumption in a standby power state by cutting off a main power supply of an outdoor unit regardless of an indoor inlet type or an outdoor inlet type of a power source and an air conditioner including the same.

To achieve these aspects, a power supply apparatus having a power saving function may include a first communication unit, a first controller configured to transmit a control signal to the first communication unit, a main power supply including a switched-mode power supply (SMPS) connected to an alternating current (AC) power supply and configured to supply power and a standby power switching unit configured to selectively switch on or off power supplied to the SMPS, an auxiliary power supply connected to the AC power supply, a second communication unit connected to the first communication unit via a communication line and configured to receive power from the auxiliary power supply, a switching driver connected to the auxiliary power supply and the second communication unit and configured to supply driving power to the standby power switching unit according to the control signal, and a second controller configured to receive power from the SMPS and selectively supply power to the switching driver.

In another aspect of the present disclosure, an air conditioner may include an indoor unit and an outdoor unit connected to each other via a communication line, wherein the indoor unit includes an indoor communication unit connected to an alternating current (AC) power supply, and an indoor unit controller configured to transmit a control signal for switching to a power saving mode to the indoor communication unit, and wherein the outdoor unit includes a main power supply including a switched-mode power supply (SMPS) connected to the AC power supply and a standby power switching unit configured to selectively switch on or off power supplied to the SMPS, an auxiliary power supply connected to the AC power supply, an outdoor communication unit connected to the indoor communication unit via a communication line and configured to receive power from the auxiliary power supply, a switching driver connected to the auxiliary power supply and the outdoor communication unit and configured to supply driving power to the standby power switching unit according to the control signal, and an outdoor unit controller configured to receive power from the SMPS and control the switching driver according to the control signal.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
    an indoor unit and an outdoor unit that exchange signals via a communication channel,
    wherein the indoor unit includes:
        an indoor communication interface connected to an alternating current (AC) power supply, and
        an indoor controller configured to transmit a control signal to the indoor communication interface, the control signal being related to switching to a power saving mode, and
    wherein the outdoor unit includes:
        a main power supply including:
            a switched-mode power supply (SMPS) connected to the AC power supply, and
            a standby power switch configured to selectively switch on or off power supplied to the SMPS,
        an auxiliary power supply connected to the AC power supply,
        an outdoor communication interface connected to the indoor communication interface via the communication channel and configured to receive power from the auxiliary power supply,
        a switching driver connected to the auxiliary power supply and the outdoor communication interface and configured to supply driving power to the standby power switching unit according to the control signal, and
        an outdoor controller configured to receive power from the SMPS and to control the switching driver based on the control signal,
    wherein the standby power switch includes:
        a first relay receiving power from the auxiliary power supply, and configured to be operated by the switching driver; and
        a second relay receiving power from the SMPS, connected to the first relay in parallel, and configured to be operated by the switching driver.

2. The air conditioner according to claim 1, wherein the standby power switch further includes a relay driver configured to drive the first relay by a driving signal transmitted by the switching driver.

3. The air conditioner according to claim 2, wherein the switching driver includes:
    a third relay connected to the auxiliary power supply;
    a first photocoupler connected to the third relay; and
    a driving signal generator configured to transmit the driving signal to the relay driver.

4. The air conditioner according to claim 3, wherein the first relay and the second relay include respective first and second switches that are turned on when a power source is supplied and the third relay includes a third switch that is turned off when the power source is supplied.

5. The air conditioner according to claim 3, further comprising a regulator connected to the SMPS and configured to transmit the driving signal to at least one of the second relay or the third relay based on the control signal.

6. The air conditioner according to claim 2, wherein the relay driver selectively drives the first relay using the auxiliary power supply.

7. The air conditioner according to claim 2, wherein the relay driver includes a transistor configured to selectively connect the auxiliary power supply to the first relay.

8. The air conditioner according to claim 7, wherein the transistor operates by the driving signal transmitted by the switching driver.

9. The air conditioner according to claim 3, wherein at least one of the indoor communication interface or the outdoor communication interface includes a second photocoupler and a third photocoupler which are connected in opposite directions.

10. The air conditioner according to claim 1, wherein the first relay is connected between the AC power supply and the SMPS.

11. The air conditioner according to claim 1, wherein the first relay is switched on by the switch driver when the indoor communication interface receives an operation state signal to switch to an operation state from a power saving mode, and
   wherein the second relay is switched off by the switching driver when the indoor communication interface receives a power saving signal to switch to the power saving mode.

* * * * *